(12) United States Patent
Jisaki et al.

(10) Patent No.: US 6,753,939 B2
(45) Date of Patent: Jun. 22, 2004

(54) LCD DEVICE WITH VERTICALLY ORIENTED LIQUID CRYSTAL SECTION UNDER NO VOLTAGE CONDITION

(75) Inventors: Makoto Jisaki, Kanagawa (JP); Hidemasa Yamaguchi, Kanagawa (JP); Yoshitoshi Kida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/154,712

(22) Filed: May 24, 2002

(65) Prior Publication Data

US 2003/0016324 A1 Jan. 23, 2003

(30) Foreign Application Priority Data

May 28, 2001 (JP) .................................... P2001-158527

(51) Int. Cl.[7] ...................... G02F 1/1335; G02F 1/1337
(52) U.S. Cl. ...................... 349/114; 349/117; 349/119; 349/123; 349/130
(58) Field of Search ................. 349/114, 117, 349/119, 123, 130

(56) References Cited

U.S. PATENT DOCUMENTS

| | | | | |
|---|---|---|---|---|
| 4,398,805 A | * | 8/1983 | Cole | ........................... 349/68 |
| 6,084,651 A | * | 7/2000 | Yamahara et al. | ........... 349/118 |
| 6,281,952 B1 | * | 8/2001 | Okamoto et al. | .............. 349/12 |
| 6,552,767 B1 | * | 4/2003 | Kaneko | ....................... 349/119 |
| 2001/0043302 A1 | * | 11/2001 | Inoue et al. | ................. 349/137 |
| 2001/0055082 A1 | * | 12/2001 | Kubo et al. | .................. 349/114 |

* cited by examiner

Primary Examiner—Tarifur R. Chowdhury
(74) Attorney, Agent, or Firm—Sonnenschein, Nath & Rosenthal LLP

(57) ABSTRACT

A liquid crystal display device where a liquid crystal section is vertically oriented with respect to both a first substrate capable of transmitting light and a second substrate which includes a reflecting region and a transmitting region. A pair of retardation films are disposed on both sides of the vertically oriented liquid crystal section, and have symmetrical phase characteristics over a visible wavelength region. Lagging phase axes of the pair of retardation films intersect each other, with an intersecting angle thereof being set in a range of from 90°±10°. Relative shifts in phase differences of the pair of retardation films are controlled within a range of ±30 nm. The reflective-and-transmissive liquid crystal display device makes it possible to provide, a high contrast and a high transmittance ratio in a transmission display mode and, a high contrast and a high reflection ratio in a reflection display mode.

9 Claims, 18 Drawing Sheets

FIG. 5

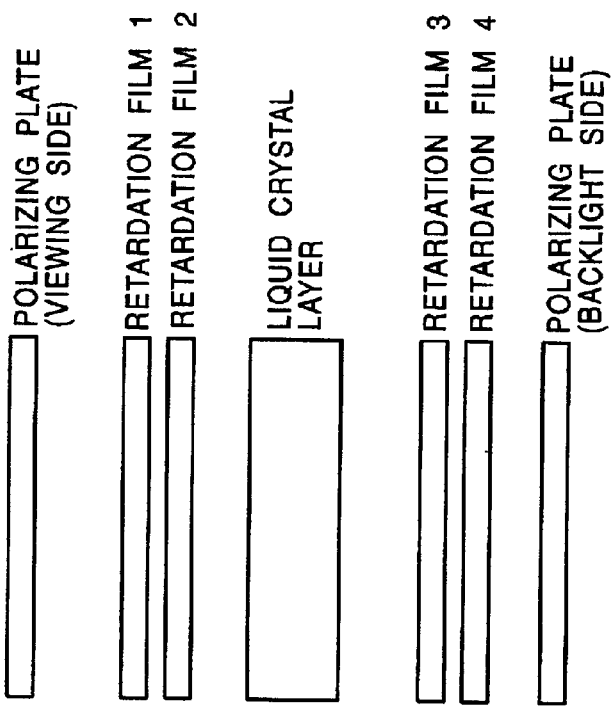

STRUCTURE OF FIRST EXAMPLE

| | | FIRST EXAMPLE |
|---|---|---|
| POLARIZING PLATE (VIEWING SIDE) | ABSORPTION AXIS | 95° |
| RETARDATION FILM 1 | PHASE DIFFERENCE | 270 nm |
| | DELAY PHASE AXIS | 110° |
| RETARDATION FILM 2 | PHASE DIFFERENCE | 140 nm |
| | DELAY PHASE AXIS | 170° |
| VERTICAL ORIENTATION LIQUID CRYSTAL | RUBBING DIRECTION | 150° |
| RETARDATION FILM 3 | PHASE DIFFERENCE | 140 nm |
| | DELAY PHASE AXIS | 80° |
| RETARDATION FILM 4 | PHASE DIFFERENCE | 270 nm |
| | DELAY PHASE AXIS | 20° |
| POLARIZING PLATE (BL SIDE) | ABSORPTION AXIS | 5° |

TRANSMISSION MODE
MEASUREMENT RESULTS

| TRANSMISSION MODE | |
|---|---|
| TRANSMITTANCE RATIO[%] | CONTRAST |
| 2.0 | 150 |

FIG. 7

| | | SECOND EXAMPLE |
|---|---|---|
| POLARIZING PLATE (VIEWING SIDE) | ABSORPTION AXIS | 95° |
| RETARDATION FILM 1 | PHASE DIFFERENCE<br>DELAY PHASE AXIS | 270 nm<br>110° – 120° |
| RETARDATION FILM 2 | PHASE DIFFERENCE<br>DELAY PHASE AXIS | 140 nm<br>170° |
| VERTICAL ORIENTATION LIQUID CRYSTAL | RUBBING DIRECTION | 150° |
| RETARDATION FILM 3 | PHASE DIFFERENCE<br>DELAY PHASE AXIS | 140 nm<br>80° |
| RETARDATION FILM 4 | PHASE DIFFERENCE<br>DELAY PHASE AXIS | 270 nm<br>20° |
| POLARIZING PLATE (BL SIDE) | ABSORPTION AXIS | 5° |

FIG. 8

| DELAY PHASE AXIS [DEGREES] | CONVERSION TRANSMITTANCE RATIO | CONVERSION CONTRAST |
|---|---|---|
| 100 | 1.786289257 | 7.54 |
| 102 | 1.864310258 | 12.09 |
| 104 | 1.925711448 | 21.88 |
| 106 | 1.969227319 | 49.41 |
| 108 | 1.994217107 | 120.00 |
| 110 | 2 | 150.00 |
| 112 | 1.986511922 | 120.00 |
| 114 | 1.954009179 | 49.11 |
| 116 | 1.903156563 | 21.65 |
| 118 | 1.834915219 | 11.91 |
| 120 | 1.750614733 | 7.39 |

FIG. 11

|  |  | THIRD EXAMPLE |
|---|---|---|
| POLARIZING PLATE (VIEWING SIDE) | ABSORPTION AXIS | 95° |
| RETARDATION FILM 1 | PHASE DIFFERENCE<br>DELAY PHASE AXIS | 270 nm<br>110° |
| RETARDATION FILM 2 | PHASE DIFFERENCE<br>DELAY PHASE AXIS | 110° – 120°<br>170° |
| VERTICAL ORIENTATION LIQUID CRYSTAL | RUBBING DIRECTION | 150° |
| RETARDATION FILM 3 | PHASE DIFFERENCE<br>DELAY PHASE AXIS | 140 nm<br>80° |
| RETARDATION FILM 4 | PHASE DIFFERENCE<br>DELAY PHASE AXIS | 270 nm<br>20° |
| POLARIZING PLATE (BL SIDE) | ABSORPTION AXIS | 5° |

FIG. 12

| PHASE DIFFERENCE [nm] | CONVERSION TRANSMITTANCE RATIO | CONVERSION CONTRAST |
|---|---|---|
| 110 | 1.960 | 33.0 |
| 120 | 1.986 | 73.6 |
| 125 | 1.994 | 105.0 |
| 130 | 1.999 | 123.0 |
| 135 | 2.001 | 145.0 |
| 140 | 2.000 | 150.0 |
| 145 | 1.995 | 145.0 |
| 150 | 1.988 | 123.5 |
| 155 | 1.977 | 99.0 |
| 160 | 1.963 | 72.6 |
| 170 | 1.925 | 32.4 |

FIG. 15

| OPTICAL DESIGN OF REFERENCE EXAMPLE | | HOMOGENEOUS ORIENTATION |
|---|---|---|
| POLARIZING PLATE (VIEWING SIDE) | ABSORPTION AXIS | 160° |
| RETARDATION FILM 1 | PHASE DIFFERENCE | 263 nm |
| | DELAY PHASE AXIS | 175° |
| RETARDATION FILM 2 | PHASE DIFFERENCE | 147 nm |
| | DELAY PHASE AXIS | 55° |
| HORIZONTAL ORIENTATION LIQUID CRYSTAL | RUBBING DIRECTION | 150° |
| RETARDATION FILM 3 | PHASE DIFFERENCE | 60 nm |
| | DELAY PHASE AXIS | 60° |
| RETARDATION FILM 4 | PHASE DIFFERENCE | 147 nm |
| | DELAY PHASE AXIS | 145° |
| RETARDATION FILM 5 | PHASE DIFFERENCE | 263 nm |
| | DELAY PHASE AXIS | 85° |
| POLARIZING PLATE (BACKLIGHT SIDE) | ABSORPTION AXIS | 70° |

LCD DEVICE WITH VERTICALLY ORIENTED LIQUID CRYSTAL SECTION UNDER NO VOLTAGE CONDITION

RELATED APPLICATION DATA

The present application claims priority to Japanese Application(s) No(s). P2001-158527 filed May 28, 2001, which application(s) is/are incorporated herein by reference to the extent permitted by law.

BACKGROUND OF THE INVENTION

1. Field of the Invention

The present invention relates to a liquid crystal display device widely used in, for example, a notebook-size personal computer, a portable terminal, a portable video tape recorder (VTR), or a digital still camera. The present invention is one related to a liquid crystal display device including a reflection function and a transmission function among the different types of liquid crystal display devices. When the liquid crystal display device has a reflection function and a transmission function, it has excellent visibility both indoors and outdoors. Accordingly, such a liquid crystal display device is suitable for use in, for example, a portable terminal, a portable VTR, or a digital still camera.

2. Description of the Related Art

Various types of flat displays where the content of display can be rewritten by modulating light using an electrical signal have been developed and produced. Self-luminous display devices which have been researched and developed a great deal in recent years include OLED (organic light emitting diode), a plasma display, and an FED (field emission display).

A self-luminous display has excellent visibility indoors compared to a liquid crystal display because the self-luminous display is brighter than the liquid crystal display. However, since the outdoor environment is often brighter than a self-luminous display disposed outdoors, the visibility of the self-luminous display device becomes considerably poor in such an environment.

In addition, in a self-luminous display, electrical current and electrical voltage required to drive it are relatively large, so that electrical power consumption thereof tends to become large. When electrical power consumption becomes large, the display device is not suitable for use in, for example, a portable terminal of a digital camera, a portable VTR, a cellular phone, or the like.

On the other hand, a reflective liquid crystal display device uses external light rather than light generated by itself for a displaying operation, so that its visibility becomes good due to increased brightness, rather than becoming poorer even when the reflective liquid crystal display device is used outdoors where there is sufficient brightness. In addition, since, unlike a transmissive liquid crystal display, a reflective liquid crystal display does not need a backlight, electrical power consumption thereof is small, so that it is most suitable for use in small portable devices.

However, although a reflective liquid crystal display device has excellent visibility in a bright outdoor environment, its visibility obviously becomes poor when it is used in a dark environment at night because it does not generate light. This occurs naturally in a reflective liquid crystal display because the brightness of the surrounding environment is directly reflected in the brightness of the display.

Accordingly, a display device of, for example, a portable terminal needs to provide excellent visibility in any environment, both indoors and outdoors. One type of display device for achieving this object is a transmissive-and-reflective liquid crystal display device. In general, the transmissive-and-reflective liquid crystal display device is realized in the following two ways.

One method is disclosed in Japanese Unexamined Patent Application Publication No. 59-218483. In this method, a transmission/reflection mode is provided by disposing a transflective film, which is a thin metallic film, between a backlight and a liquid crystal layer. However, in principle, in this transmission/reflection mode, the transmission mode and the reflection mode cannot be optimized at the same time. More specifically, since the same liquid crystal layer is used in the transmission mode and the reflection mode, when optical designing is carried out by giving precedence to the transmission mode, the visibility in the reflection mode is reduced, whereas, when optical designing is carried out by giving precedence to the reflection mode, optical characteristics during transmission of light become poor.

The other method is disclosed in Japanese Unexamined Patent Application Publication No. 11-242226. In this method, a reflection/transmission mode is achieved by separating a reflection section and a transmission section within a pixel area. The orientation states of liquid crystals of the transmission section and the reflection section are made different, so that thought is put in obtaining good optical characteristics during reflection and transmission of light.

More specifically, optimization is achieved by changing the thicknesses of the liquid crystals at the reflection section and at the transmission section within a pixel. In other words, by setting the phase differences of wavelengths in the visible wavelength region when the voltage is turned on and when it is turned off at $\lambda/2$ in the transmission section and at $\lambda/4$ in the reflection section, a high reflection ratio, a high transmission ratio, and high contrast are achieved at both the reflection section and the transmission section. That is, the thickness of the liquid crystals at the transmission section is twice the thickness of the liquid crystals at the reflection section.

Japanese Patent Application Nos. 9-359036 and 10-364247 introduce as liquid crystal modes, such as: (1) a guest host mode in which doping of a dichroic coloring material is carried out, (2) a twist orientation mode, and (3) a homogeneous orientation mode. Emphasis is put in making the thickness of the portion of the liquid crystal layer at the transmission section and that of the portion of the liquid crystal layer at the reflection region different from each other.

Here, by changing the thickness of the portion of the liquid crystal layer at the transmission region and the thickness of the portion of the liquid crystal layer at the reflection region, panels in the liquid crystal modes (1), (2), and (3) were experimentally produced and inspected. In particular, the mode (3) was studied at great length because it was closest to being used for practical purposes.

A reflective-and-transmissive liquid crystal device in which the guest host mode (mode (1)) was used was produced and evaluated. The result of the evaluation makes it possible to confirm that the reflection ratio and the transmission ratio are high because a polarizing plate is not used. However, it has been found that contrast is not sufficient because the black level cannot be made sufficiently low due to insufficient ratio between the two colors of the dichroic coloring material.

The twist orientation mode (mode (2)) was used in a reflective-and-transmissive liquid crystal display device in order to produce and evaluate a panel. The result of the evaluation showed that, when a twist orientation process is carried out, it is difficult to control the orientation of the liquid crystals at the boundary between the transmission region and the reflection region.

An evaluation in the homogeneous mode (mode (3)) was carried out. In the homogeneous mode, liquid crystal molecules are orientated horizontal (parallel) to a substrate. The directions of orientation of the liquid crystals within a plane are often controlled to one direction by rubbing or the like. The vertical rubbing directions are anti-parallel directions. In the case where a horizontal mode is used, when there is a step at the transmission section and the reflection section, there is the advantage that retardation can be precisely obtained in proportion to the difference in the level. More specifically, if the thickness of the portion of the liquid crystal layer at the reflection section is made half that of the portion of the liquid crystal layer at the transmission section, the difference in retardation is halved. In the horizontal mode, liquid crystal material whose dielectric anisotropy is positive is used.

The inventor et al. repeatedly experimentally produced and inspected the panel that was optically designed so that the reflective-and-transmissive device whose liquid crystals were horizontally oriented was in a normally white mode. The results showed that the reflective-and-transmissive device of this type has the following disadvantages.

It has been made clear that, in the horizontal mode, even if a voltage of 5 volts is applied to the liquid crystal panel, the liquid crystals are not completely vertical, so that retardation remained. The remaining retardation is of the order of approximately 60 mm.

It is possible to increase contrast by inserting a retardation film equivalent to the remaining retardation between polarizing plates in order to decrease the black level. However, since the remaining retardation depends upon the thickness of a cell, it is not constant. In addition, the retardation film is produced by subjecting a polymer to centrifugal processing, so that there are variations in the retardation value. In other words, the retardation value is not constant. Therefore, it is very difficult to completely cancel the variations in these retardation values.

In addition, wavelength dispersion of the refractive index of the liquid crystal material and the wavelength dispersion of the retardation film can never become exactly the same.

Due to these reasons, the invention et al. have concluded that it is very difficult to obtain high contrast in the horizontal mode.

Even if high contrast is obtained, the necessity of using one retardation film for a dark display leads to increased costs. In particular, production process of a small retardation film of a few tens of millimeters in size becomes a delicate process, thereby resulting in high costs.

The viewing angle was also evaluated. In the horizontal orientation mode, the orientation of the liquid crystals is controlled in one direction by rubbing or the like. Therefore, the liquid crystal molecules stand up in one direction.

When the panel is viewed from the standing-up direction of the liquid crystal molecules, the retardation of the liquid crystals becomes large. When it is viewed from a direction opposite to this direction (180-degree rotation), however, the retardation of the liquid crystals becomes small. Accordingly, in a uniaxial orientation mode where the liquid crystal molecules are tilted only in one direction by an electrical field, the effective retardation differs greatly depending on the viewing direction.

It goes without saying that differences in retardation depending on the viewing direction cause differences in image depending upon the viewing direction. In other words, when the retardation is greatly dependent upon the viewing angle, the viewing angle characteristic of the visibility of the panel naturally becomes poor. The inventor et al. have confirmed that, even in the experiment, the viewing angle characteristic in the horizontal mode is very poor in principle. This principle results from the reasons given above. Accordingly, the inventor et al. have realized that the horizontal mode is not suitable for use in a reflective-and-transmissive liquid crystal display device.

SUMMARY OF THE INVENTION

Accordingly, the present invention attempts to overcome the problems of a reflective-and-transmissive liquid crystal display device, and to make it possible to, in a transmission display mode, provide high contrast and a high transmission ratio, and, in a reflection display mode, provide high contrast and a high reflection ratio. In addition, the present invention tries to make it possible to achieve a wide viewing angle in both the transmission mode and the reflection mode.

To these ends, according to a basic form of the present invention, there is provided a liquid crystal display device comprising a first substrate capable of transmitting light therethrough; a second substrate at which a pixel including a reflection region and a transmission region is formed; and a liquid crystal section held by the first substrate and the second substrate that are bonded together through a gap. In the liquid crystal display device, the liquid crystal section is oriented vertically with respect to the substrates when no voltage is applied thereto. In addition, a pair of retardation films are disposed on both sides of the vertically oriented liquid crystal section, and have symmetrical phase characteristics over a visible wavelength region. In one form of the basic form, lagging phase axes of the pair of retardation films intersect each other, with an intersecting angle thereof being set in a range of 90°±10°. In another form of the basic form, relative shifts in phase differences of the pair of retardation films are controlled within a range of ±30 nm.

In still another form of the basic form, a thickness of a portion of the liquid crystal section at the transmission region is twice a thickness of a portion of the liquid crystal section at the reflection region. In still another form of the basic form, at least one of the first and second substrates includes a step for changing the thickness of the liquid crystal section by the transmission region and the reflection region. When at least one of the first and second substrates includes a step for changing the thickness of the liquid crystal section by the transmission region and the reflection region, the step may be a recess formed by selectively removing an insulating film formed at at least one of the first and second substrates from the transmission region. When the step is a recess formed by selectively removing an insulating film formed at at least one of the first and second substrates from the transmission region, the liquid crystal display device may be constructed so that the orientation of the liquid crystal section is controlled using the recess, and the vertical orientation thereof switches to a multiaxial orientation thereof by application of a voltage. When the liquid crystal display device is constructed so that the orientation of the liquid crystal section is controlled using the recess, and the vertical orientation thereof switches to a multiaxial orientation thereof by application of a voltage, the recess may be symmetrical about a geometrical center point thereof.

In still another form of the basic form, the liquid crystal display device may be constructed so that the liquid crystal section has a chiral agent added thereto, and the vertical orientation thereof changes to a twist orientation thereof by application of a voltage. In still another form of the basic form, the liquid crystal display device may be constructed so that a portion of the liquid crystal section at the transmission region is oriented multiaxially by application of a voltage, and a portion of the liquid crystal section at the reflection region is oriented uniaxially by application of a voltage. When the liquid crystal display device is constructed so that a portion of the liquid crystal section at the transmission region is oriented multiaxially by application of a voltage, and a portion of the liquid crystal section at the reflection region is oriented uniaxially by application of a voltage, the liquid crystal section may be controlled so as to be oriented multiaxially using an electrode slit or a columnar member formed at the transmission region. When the liquid crystal section is controlled so as to be oriented multiaxially using an electrode slit or a columnar member formed at the transmission region, the columnar member may also serve as a spacer for restricting the gap between the first and second substrates at a constant size. In still another form of the basic form, the reflection region is subjected to rubbing for uniaxially orienting the liquid crystal section, while the transmission region is not subjected to rubbing. In still another form of the basic form, by selective irradiation using ultraviolet light, a difference is produced between a surface state of the transmission region and a surface state of the reflection region in order to cause the state of orientation of the liquid crystal section to differ by the transmission region and the reflection region.

The inventor et al. have studied various liquid crystal modes as means for overcoming the above-described problems. The results showed that the vertical orientation mode in which liquid crystal molecules are oriented perpendicular to a substrate is an optimal mode. The liquid crystal material used in this mode has a characteristic in which, whereas the refractive index anisotropy is parallel to a long axis direction of the liquid crystal, the dielectric anisotropy is orthogonal to the long axis direction of the liquid crystal. It has been found that high contrast, high transmission ratio/high reflection ratio, and a wide viewing angle are obtained in both reflection display and transmission display by optimizing the vertical orientation feature and optical designing. The designing method and principle are as described above. In other words, it is important that the pair of retardation films which are provided on both sides of a liquid crystal panel in the vertical orientation mode have symmetrical phase characteristics over the visible wavelength range. More specifically, the lagging phase axes of the pair of retardation films intersect each other, with the angle of intersection being set within the range of 90°±10°. Relative shifts in the phase differences of the pair of retardation films are controlled within the range of ±30 nm.

It is desirable that the display in the transmission mode and the reflection mode be carried out by obtaining, in particular, a cell structure where the thickness of the portion of the liquid crystal section at the transmission region is approximately twice that of the portion of the liquid crystal section at the reflection region by making use of vertical orientation. When an electrical field is turned off, the liquid crystal is vertically oriented, so that retardation does not occur. When an electrical field is turned on, the liquid crystal is tilted, so that retardation occurs. The thickness of the cell is provided and the step that is formed at the reflection region and the transmission region is designed so that this retardation value is $\lambda/2$ in the transmission region and $\lambda/4$ in the reflection region.

BRIEF DESCRIPTION OF THE DRAWINGS

FIG. 5 is a table showing the structural features of the first example.

FIG. 7 is a table illustrating the structural features of a second example.

FIG. 8 is a table showing the results of measurements of optical characteristics of the second example.

FIG. 11 is a table illustrating the structural features of a third example.

FIG. 12 is a table showing the results of measurements of the third example.

FIG. 15 is a table illustrating the optical design of a reference example.

DESCRIPTION OF THE PREFERRED EMBODIMENT

Figure 1A:
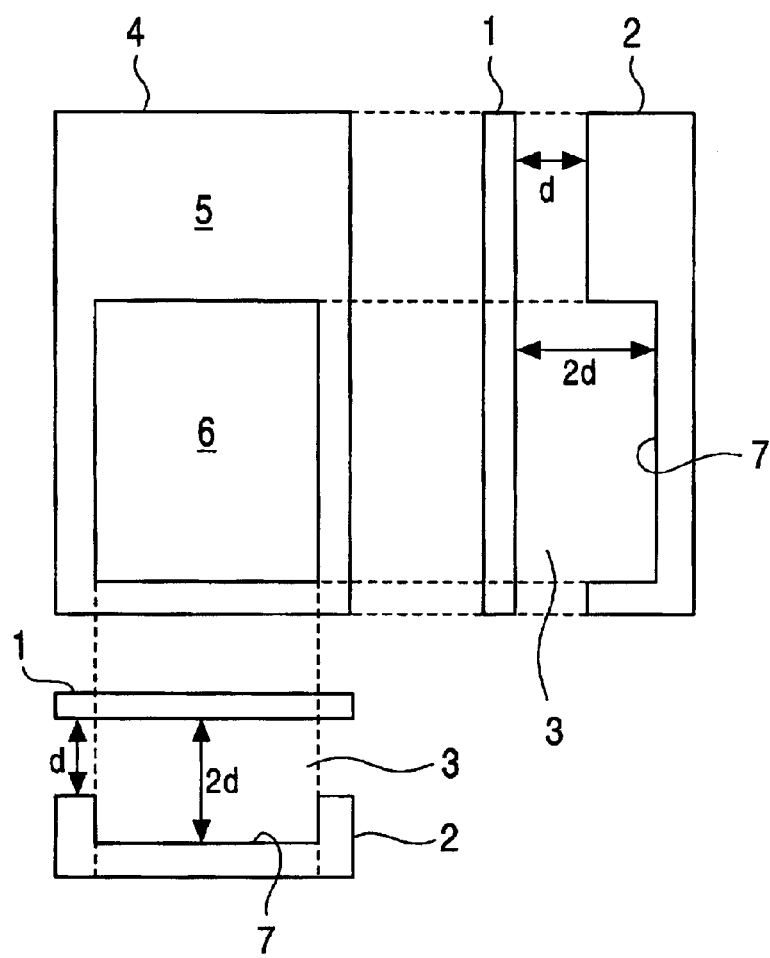
FIGS. 1A and 1B are schematic views showing the basic structure of a liquid crystal display device of the present invention.
Figure 1B:
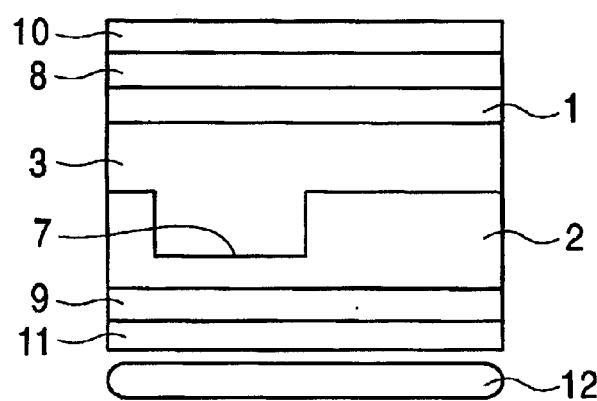

Hereunder, a description of an embodiment of the present invention will be given in detail with reference to the relevant drawings. FIGS. 1A and 1B are schematic views of the basic structure of a liquid crystal display device of the present invention. More specifically, FIGS. 1A and 1B are a three-side view and a sectional view of the basic structure of the liquid crystal display device of the present invention, respectively. As shown in FIGS. 1A and 1B, the liquid crystal display device of the present invention comprises a first substrate 1 which can transmit light therethrough, a second substrate 2 where a pixel 4 including a reflection region 5 and a transmission region 6 are formed, and a liquid crystal layer 3 held by the first substrate 1 and the second substrate 2 that are bonded together through a gap. The liquid crystal layer 3 is oriented perpendicular to the first substrate 1 and the second substrate 2 when a voltage is not applied thereto. A pair of retardation films 8 and 9 are disposed on both sides of the vertically oriented liquid crystal layer 3. A pair of polarizing plates 10 and 11 are disposed outwardly of the retardation films 8 and 9, respectively. A backlight 12 is disposed at the outer side of the polarizing plate 11. Here, the pair of retardation films 8 and 9 have symmetrical phase characteristics over the visible wavelength region. More specifically, lagging phase axes of the pair of retardation films 8 and 9 intersect each other, with the angle of intersection being set in a range of 90°±10°. The relative shifts in the phase differences of the pair of retardation films 8 and 9 are controlled within a range of ±30 nm.

Desirably, a thickness 2d of a portion of the liquid crystal layer 3 at the transmission region 6 is twice a thickness d of a portion of the liquid crystal layer 3 at the reflection region 5. For example, at least one of the first substrate 1 and the second substrate 2 has a step for changing the thickness of the liquid crystal layer 3 by the transmission region 6 and the reflection region 5. The step is formed by a recess 7, which is formed by selectively removing portions of an insulation film formed at at least one of the first substrate 1 and the second substrate 2 from the transmission region 6. The orientation of the liquid crystal layer 3 is controlled using the recess 7, and, when a voltage is applied, the vertical orientation switches to a multiaxial orientation. The recess 7 is symmetrical around a geometrical center point.

Preferably, a chiral agent is added to the liquid crystal layer 3. When a voltage is applied to the liquid crystal layer 3, the vertical orientation changes to a twist orientation. Also, when a voltage is applied to the liquid crystal layer 3, the portion of the liquid crystal layer 3 at the transmission region 6 is multiaxially oriented, while the portion thereof at the reflection region 5 is uniaxially oriented. For example, by making use of an electrode slit or a columnar member formed at the transmission region 6, the orientation of the liquid crystal layer 3 can be controlled so that it is multiaxial. In this case, the columnar member can serve as a spacer for restricting the gap between the first substrate 1 and the second substrate 2 at a constant size. Preferably, the reflection region 5 is subjected to rubbing to cause the orientation of the liquid crystal layer 3 to be uniaxial, whereas the transmission region 6 is not subjected to rubbing. In some cases, the orientation states of the portions of the liquid crystal layer 3 at the transmission region 6 and the reflection region 5 may be made different by producing a difference between the surface states of the transmission region 6 and the reflection region 5 by selective irradiation with ultraviolet light.

As shown in FIG. 1B, a method using a wide-band λ/4 film as the retardation film 8 is effective in obtaining high contrast in a reflection mode. This is a method for achieving a dark display using only the polarizing plate 10 and the wide-band λ/4 film 8 after eliminating retardation of the liquid crystal layer 3. The λ/4 film 8 satisfies the λ/4 condition in a wide band. Since incident light is reflected at the reflection region at the substrate 2, so that it passes through the λ/4 film 8 twice, linearly polarized light is rotated 90 degrees. This means that linearly polarized light that has entered from the polarizing plate 10 does not exit from the display device at all, making it possible to obtain high contrast as a result of reduced black level. The inventor et al. have determined that it is effective to use this method. In other words, they have used a structure in which the polarizing plate 10 and the λ/4 film 8 are disposed at the front surface side of the liquid crystal display device. The orientation of the liquid crystal layer 3 is a vertical orientation. Since the liquid crystal molecules are oriented vertically when an electrical field is turned off, there is no retardation. Therefore, the reflection mode is a normally black mode.

When the liquid crystal display device is designed so that the reflection mode is a normally black mode, it obviously needs to be designed so that a transmission mode is similarly a normally black mode. In order to cause the transmission mode to be a normally black mode, the following needs to be done. A method for disposing a polarizing plate and a retardation film, which is effective for the transmission mode, is also shown in FIG. 1B. The retardation film 9 that is exactly equivalent to the λ/4 film 8 disposed at the front surface side of a panel must be rotated by 90 degrees and disposed at the back surface side of the panel, or a retardation film which has optical effects that are the same as the optical effects of the retardation film 9, obtained by a 90 degree rotation, must be disposed at the back surface side of the panel. This becomes clear from an analysis of the state of propagation of light exiting from the backlight 12 in the structure shown in FIG. 1B.

The propagation of light in the transmission region 6 is analyzed. Light from the backlight 12 is converted into linearly polarized light by the polarizing plate 11. Then, the linearly polarized light is converted into circularly polarized light by the back-surface-side λ/4 retardation film 9. Next, when it passes through the liquid crystal layer 3, there is no phase difference because the liquid crystals are vertically oriented, so that its polarization state is not changed. Then, the circularly polarized light passes through the front-surface-side retardation film 8 whose optical axis has been rotated by 90 degrees with respect to the retardation film 9. At this time, the circularly polarized light is converted into linearly polarized light, so that the polarization direction is exactly the same as that when the light has passed through the polarizing plate 11. Since the polarizing plates 11 and 10 are orthogonal to each other, the light does not pass through the polarizing plate 10, so that it appears dark. The black level at this time is the same as that when the polarizing plates are disposed in a cross-Nicol arrangement, so that the strength of the transmitted light with a very high black level is small, thereby making it possible to readily obtain high contrast in the transmission mode.

It is possible to drive the display device in the normally black mode even if the pair of retardation films 8 and 9 and the pair of polarizing plates 10 and 11 are disposed parallel to each other instead of perpendicular to or 90 degrees from each other as described. This principle can be realized by forming a λ/2 film using two λ/4 retardation films to rotate incident linearly polarized light by 90 degrees. However, it is very difficult to satisfy the λ/2 condition in the visible wavelength region using two retardation films. A dark state can be readily obtained by disposing them orthogonal to each other as mentioned above rather than disposing them parallel to each other.

When the pair of retardation films 8 and 9 are disposed orthogonal to each other, it is necessary for the λ/4 retardation film 8 and the λ/4 retardation film 9 to have exactly equivalent phase differences in the visible wavelength region. This is because a dark display is realized when all light of various wavelengths are cancelled by the λ/4 retardation film 8 and the λ/4 retardation film 9.

Even in the reflection mode, the front-surface-side λ/4 retardation film 8 is used, so that it needs to be a wide-band λ/4 film. The structure of an ideal retardation film is described below. The λ/4 retardation films 8 and 9 both have phases differences of λ/4 in the visible wavelength region, and their optical axes are disposed at an angle of 90 degrees from each other.

The λ/4 retardation films 8 and 9 may be uniaxial retardation films or biaxial retardation films. However, regarding phase differences within a plane, it is necessary to satisfy the aforementioned two conditions.

In order to increase viewing angle, retardation films whose refractive index anisotropies are negative may be disposed instead of the λ/4 retardation films 8 and 9. However, regarding phase differences within a plane, it is similarly necessary to satisfy the aforementioned conditions.

When a voltage is applied to the transmission region 6, the vertical orientation of the liquid crystal layer 3 changes to a multi-axial orientation, so that the transmission region 6 functions as a λ/2 retardation film. Therefore, incident linearly polarized light is rotated 90 degrees and becomes exiting linearly polarized light, which passes through the front-surface-side polarizing plate 10. Therefore, a bright display is obtained. On the other hand, when a voltage is applied to the reflection region 5, the vertical orientation of the liquid crystal layer 3 changes to a uniaxial orientation, so that the reflection region 5 functions as a λ/4 retardation film. Since light moves forward and backward in the reflection region, the liquid crystal layer 3 in effect becomes equivalent to a λ/2 retardation film like the transmission region due to the same forward and backward movement of light. The incident linearly polarized light is rotated 90 degrees and becomes exiting linearly polarized light, which passes through the front-surface-side polarizing plate 10. Therefore, a bright display is obtained. As mentioned above, the thickness of the portion of the liquid crystal layer 3 at the transmission region 6 is twice the thickness of the portion of the liquid crystal layer 3 at the reflection region 5. The transmission region 6 functions as a λ/2 retardation film when a voltage is applied, and the reflection region 5 functions as a λ/4 retardation film when a voltage is applied.

Figure 2:
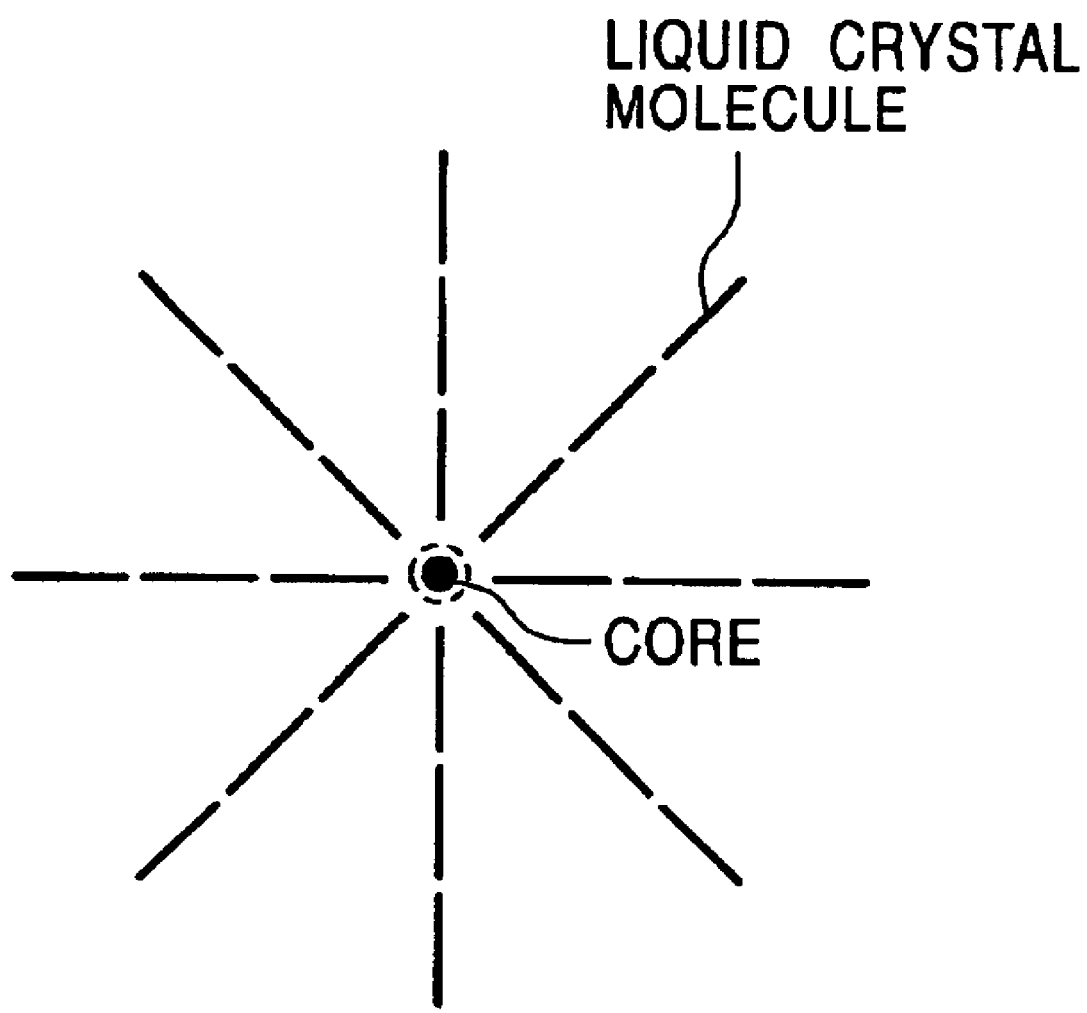
FIG. 2 is a schematic view showing the state of orientation of liquid crystal in the liquid crystal display device shown in FIGS. 1A and 1B.

The inventors et al. have, particularly, studied a method for orienting liquid crystals effective in increasing the viewing angle property during transmission of light. The result of the study is as follows. As shown in FIG. 2, when an electrical field is not applied, vertical orientation is realized. By applying an electrical field, liquid crystal molecules are tilted. The tilting directions are uniformly distributed within a 360-degree plane, so that the orientations of the liquid crystal molecules are what are called radial or multi-axial orientations. It has been found that, by this, the viewing angle can be considerably increased. By controlling the orientations of the reflection section and the transmission section in this way, it is possible to dramatically increase the viewing angle in both modes. It has been confirmed that, in particular, controlling the orientation of the transmission section as described above provides greater effects than controlling the orientation of the reflection section. This is because, even if the tilting directions in the reflection section are uniform, it can provide a wide viewing angle by setting a scatter reflecting plate or the like.

Technologies for controlling the orientations of liquid crystals in various directions have already been studied as disclosed in, for example, Y. Toko et al., Sid '93 Digest of Tech. Papers, 24 (1993) 622. In the disclosed technology, the orientations of the liquid crystals are distributed without rubbing in a TN mode.

Similarly, a technology for achieving vertical orientation is reported in, for example, T. Yamamoto et al., SID '91 Digest of Tech. Papers, 22 (1991) 1081. This technology makes it possible to increase viewing angle by radially tilting liquid crystal molecules by making use of an electrical field.

A technology which makes it possible to increase transmittance ratio while increasing viewing angle by distributing the orientations of liquid crystals in various directions in the vertical orientation mode is been reported in Y. Iwamoto et al., SID '00 Digest of Tech. Papers, 31 (2000) 902. In this report, while increasing the viewing angle by radially distributing the liquid crystal orientation directions by an electrical field, the transmittance ratio is increased by disposing λ/4 films in front of and behind a polarizing plate. This principle holds because, by providing λ/4 films, the transmittance ratio is no longer dependent upon the orientations of the liquid crystals. At the same time, in this reported technology, light is transmitted through a region where the liquid crystals are oriented in the same direction as the polarizing plate.

Even in the present invention, it is necessary to dispose a λ/4 film at the transmission display region. To achieve this, it is possible to combine the technology of the present invention with the technology reported in the aforementioned Y. Iwamoto et al. SID '00 Digest of Tech. Papers, 31 (2000) 902. In other words, by distributing the orientation states of the liquid crystal molecules in the transmission region in all directions by some method, it is possible to increase the viewing angle and to achieve a high transmittance ratio at the same time.

It is not necessary to distribute the directions of orientation of the liquid crystals through 360 degrees. In general, the same advantages can be obtained even if the orientation directions of the liquid crystals are divided multiaxially, such as two directions, three directions, or four directions.

Various methods for tilting the liquid crystal molecules in the transmission display region in all directions when an electrical field is turned on can be proposed. Among these methods, the method considered particularly effective by the inventor et al. is the one introducing a groove-like structure by forming a step at the reflection section and the transmission section. At the same time, it is desirable that the structure satisfy the condition of setting the thickness of the portion of the liquid crystal layer 3 at the transmission region 6 twice the thickness of the portion of the liquid crystal layer 3 at the reflection region 5.

Figure 3:
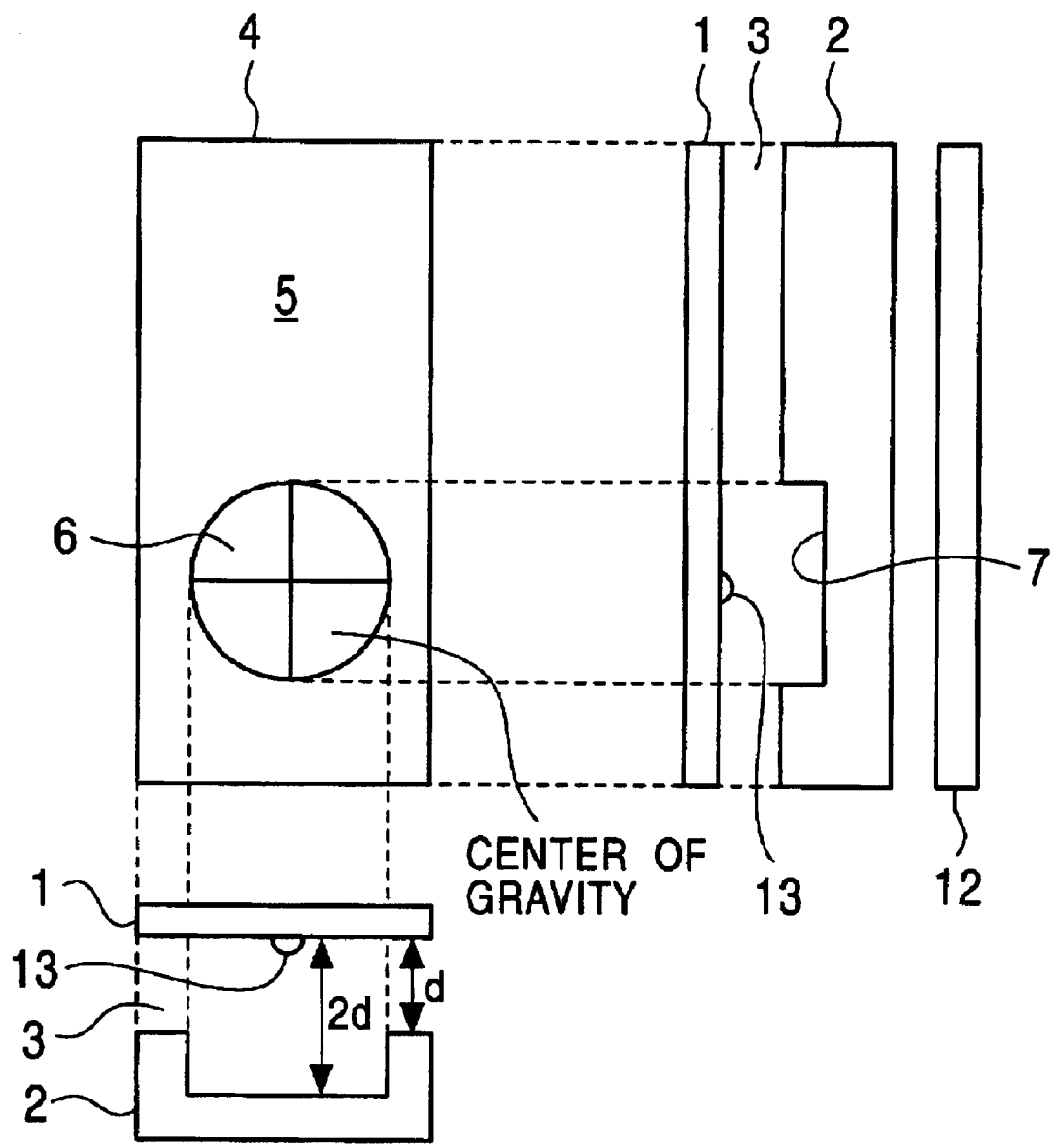
FIG. 3 is a schematic view showing a modification of the liquid crystal display device shown in FIGS. 1A and 1B.

A specific form of such a structure shown in FIG. 3 may be used. For the sake of easy understanding, corresponding parts to those of the embodiment shown in FIGS. 1A and 1B are given the same reference numerals. In this modification, it is desirable that the shape of the recess 7 be symmetrical with respect to the center of gravity of the transmission region 6. This is because it is easier to control the orientation of the liquid crystal layer 3 radially towards the center from the center of gravity. Accordingly, the recess 7 is formed as a groove shown in FIG. 3. The recess 7 is most suitable for a controlling operation carried out to radially tilt the liquid crystal molecules when an electrical field is applied because the liquid crystal molecules are oriented along the tilt angle of the groove.

It is desirable to dispose a core that induces the liquid crystal molecules to be orientated radially when an electrical field is turned on at a location situated approximately at the center of gravity of the transmission region 6. The core may be disposed at either side of the substrate 1 that holds the liquid crystal layer 3. The core may be produced by subjecting an electrode to patterning and removing portions thereof, or by forming a protrusion 13 by a photolithography process using, for example, a planarizing film or the like as shown in FIG. 3. In producing a core using a protrusion, the protrusion can function as a spacer for maintaining a gap between the two substrates 1 and 2.

It is apparent from the following examples that a wide viewing angle and a high transmission ratio in the transmission mode can be achieved by controlling the orientation of the liquid crystals at the transmission region of the reflective-and-transmissive liquid crystal device proposed by the inventor et al. as described above.

Figure 4:
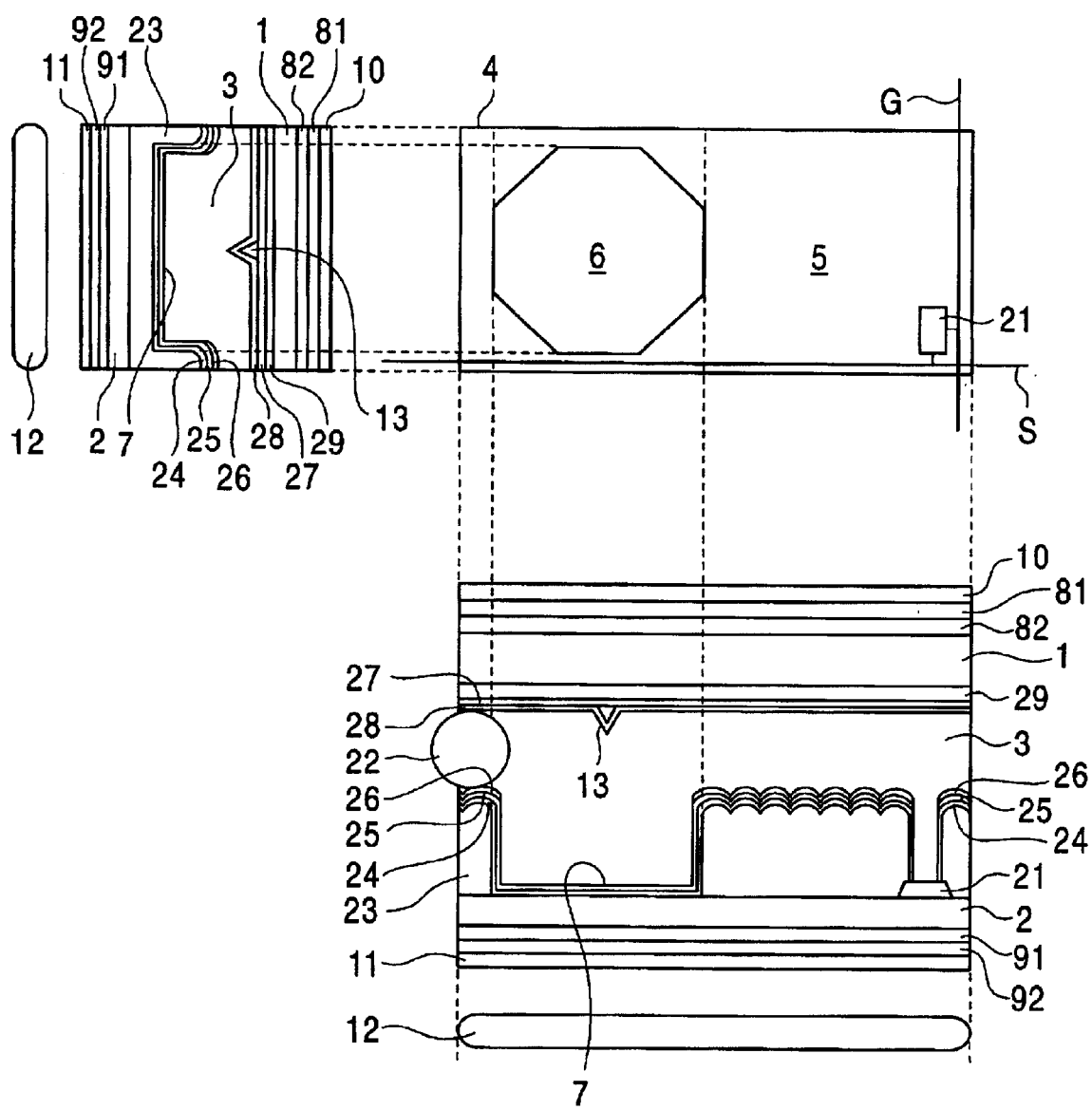
FIG. 4 is a schematic view of a first example of the liquid crystal display device of the present invention.

The cross-sectional structure of a panel of the liquid crystal device of a first example is shown in FIG. 4. For the sake of easy understanding, corresponding parts to those of the embodiment shown in FIGS. 1A and 1B are given the same reference numerals. The liquid crystal display device comprised two substrates, a color filter substrate 1 and a TFT (thin film transistor) substrate 2. It was constructed so that a liquid crystal layer 3 was provided between the two substrates 1 and 2 through a spacer 22.

A TFT element 21 for actively driving a pixel 4 was formed at the TFT substrate 2. A signal line S and a gate line G, connected to the TFT element 21, were also formed. Transparent photosensitive resin serving as a planarizing layer 23 was subjected to patterning on the TFT element 21. The thickness of the planarizing layer 23 was approximately 2.0 μm. The planarizing layer 23 was subjected to patterning so that portions thereof did not remain at a transmission region 6. The transmission region 6 included a regular octagonal recess 7. ITO, being a transparent electrode 24, was formed on the planarizing film 23 over the entire pixel area. A bumpy structure having a light-scattering effect was formed at a reflection region 5 of the pixel at the transparent electrode 24 by patterning using photosensitive resin. A metal (aluminum) film 25 functioning as a reflective plate and an electrode was formed at the bumpy structure of the reflection region 5. Patterning was carried out so that a transistor drain electrode, the ITO, and the aluminum were physically in contact in the pixel structure at the TFT side.

Red (R), green (G), and blue (B) color filters 29 were formed with stripe forms on the color-filter (CF) substrate 1. A transparent electrode 27 having a thickness of 100 mm was formed on the color filters 29 using ITO. A conical protrusion 13 was formed on the ITO at the CF-side substrate 1. The protrusion 13 was formed by subjecting photosensitive resin to photolithography. The photosensitive material was used for spin coating, and was subjected to exposure and development. Then, it was subjected to mid-baking at 180° C. in order to form a structure that is close to a conical structure. The radius and height of the protrusion 13 were 5 μm and 1.5 μm, respectively. The protrusion 13 was disposed so that, when it was superimposed, it was positioned at the center of the octagonal transmission region 6 at the TFT substrate 2.

Vertical alignment films 26 and 28 were formed on both the TFT substrate 2 and the CF substrate 1, respectively, by a 50-mm printing method using an alignment agent JALS-2021 (produced by JSR). Thereafter, heat treatment was carried out in an oven for one hour at a temperature of 180° C. After the heat treatment, the alignment films 26 and 28 were subjected to rubbing so that, when the TFT substrate 2 and the CF substrate 1 were superimposed upon each other, the rubbing directions were anti-parallel to each other.

An electrically conductive agent for connecting a common electrode was applied to the rubbed TFT substrate 2, after which the spacer 22 formed of an acrylic material and having a size of 2.0 μm was dispersed. A sealing material was applied to the CF substrate 1. The TFT substrate 2 and the CF substrate 1 were superimposed upon each other, and left under a pressure of 13.3 Pa and at a temperature of 120° C. and adhered together. It was confirmed that, after superimposing them, the thickness of the transmission section 6 was 4.0 μm and the thickness of the reflection section 5 was 2.0 μm.

The liquid crystals 3 were injected into a hollow panel by a vacuum injection method. The injected liquid crystals 3 were liquid crystals having a negative dielectric anisotropy (Δ∈) of −5.5. Its refractive index anisotropy (Δn) was 0.08.

Thereafter, retardation films and polarizing plates were adhered together. A layered structure was formed by placing upon each other from the top side a polarizing plate 10 (viewing side), a retardation film 81, a retardation film 82, the liquid crystal layer 3, a retardation film 91, a retardation film 92, and a polarizing plate 11 (backlight side) in that order. By the retardation films 81 and 82, disposed at the viewing side, a λ/4 film was formed. By the retardation films 91 and 92, disposed at the backlight side, the other λ/4 film was formed.

FIG. 5 schematically illustrates the panel structural features in the first example shown in FIG. 4 using a table. As illustrated in the table, the liquid crystal display device of the first example had a layered structure formed by placing upon each other from the top side, viewing-side polarizing plate, retardation film 1, retardation film 2, a liquid crystal layer, retardation film 3, retardation film 4, and backlight-side polarizing plate in that order. The viewing-side retardation films 1 and 2 formed one λ/4 film, and the backlight-side retardation films 3 and 4 formed the other λ/4 film. The viewing-side retardation film 1 and the backlight-side retardation film 4 corresponded to each other, and had equal phase differences of 270 nm. The retardation films 2 and 3 corresponded to each other, and had equal phase differences of 140 nm. The lagging phase axes of the retardation films 1 and 4, which corresponded to each other, were orthogonal to each other (90 degrees from each other). Similarly, the lagging phase axes of the retardation films 2 and 3 were orthogonal to each other. The absorption axes of the viewing-side polarizing plate and the backlight-side polarizing plate were orthogonal to each other.

The measurement results of the panel having this structure in the transmission mode are also shown in FIG. 5. During a dark display, the transmittance ratio was 2.0%, and the contrast, which represents a ratio between the dark display and a bright display, was 150. In the transmission display mode in the example, the retardation films 1 and 4 and the retardation films 2 and 3 had the same phase differences, and had lagging phase axes that were orthogonal to each other, so that the transmittance ratio in the darkest state was small, and the contrast was high.

The optical characteristics of the reflective-and-transmissive liquid crystal display device of the first example was measured in accordance with the following definitions. The reflection ratio and the contrast in the reflection mode was measured by defining them in the following way. In other words, the reflection ratio was defined by the strength of reflection in a direction of a normal line of the panel of parallel light beams incident upon the panel at an angle of 30 degrees from the normal line direction of the panel. However, the strength of reflection where the reflection ratio was 100% was defined as the reflection ratio of a standard white plate (MgO). The contrast in the reflection mode was defined as a value obtained by dividing the reflection ratio when a voltage of 4.5 V was applied by the reflection ratio when a voltage was not applied. The transmittance ratio, contrast, and viewing angle in the transmission mode were measured by defining them in the following way. The transmittance ratio in the transmission mode was defined as a value obtained by dividing the strength of light that has passed through the liquid crystal panel when a voltage of 4.5 V was applied by the intensity of light of the backlight. The contrast was defined as a value obtained by dividing the intensity of the transmission light when a voltage of 4.5 V was applied by the intensity of the transmission light when no voltage was applied.

Figure 6:
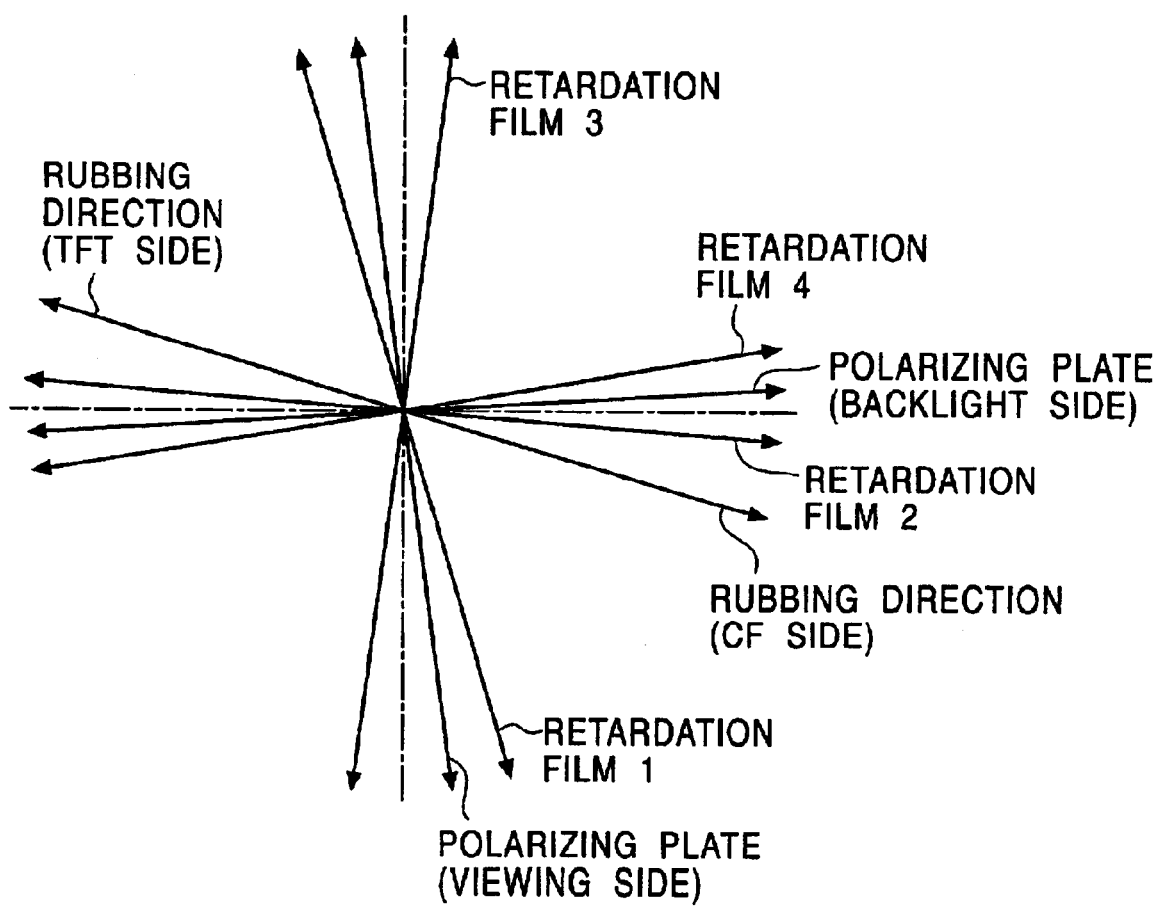
FIG. 6 is a schematic view of the structural features of the first example.

FIG. 6 schematically illustrates the positional relationship between the retardation films and the polarizing plates illustrated in FIG. 5. The double-headed arrows shown in FIG. 6 represent the directions of the lagging phase axes of the retardation films and the absorption axes of the polarizing plates. The directions were measured in a counter-clockwise direction with reference to a horizontal axis, and the angles thereof are summarized in the table of FIG. 5. As is clear from the schematic view of FIG. 6, the lagging axes of the retardation films 1 and 4, which corresponded to each other, were orthogonal to each other; and those of the retardation films 2 and 3 were orthogonal to each other. Similarly, the absorption axes of the viewing-side polarizing plate 1 and the backlight-side polarizing plate 2 were orthogonal to each other. In addition, the rubbing direction at the TFT substrate side and the rubbing direction at the CF substrate side were anti-parallel to each other.

FIG. 7 summarizes the structural features of a second example in the form of a table. The structural features of the second example are essentially the same as the ideal structural features of the first example shown in FIG. 5. The second example differs from the first example in that the lagging phase axis of a retardation film 1 is changed by 2 degrees between a range of angles of from 100 degrees to 120 degrees.

Under this condition, the optical characteristics of the second example in the transmission mode were measured. The results of the measurements are shown in FIG. 8. As mentioned above, in the second example, the lagging phase axis of the retardation film 1 was changed by 2 degrees between the range of from 100 degrees to 120 degrees. Therefore, the transmittance ratio and contrast were measured for each angle.

Figure 9:
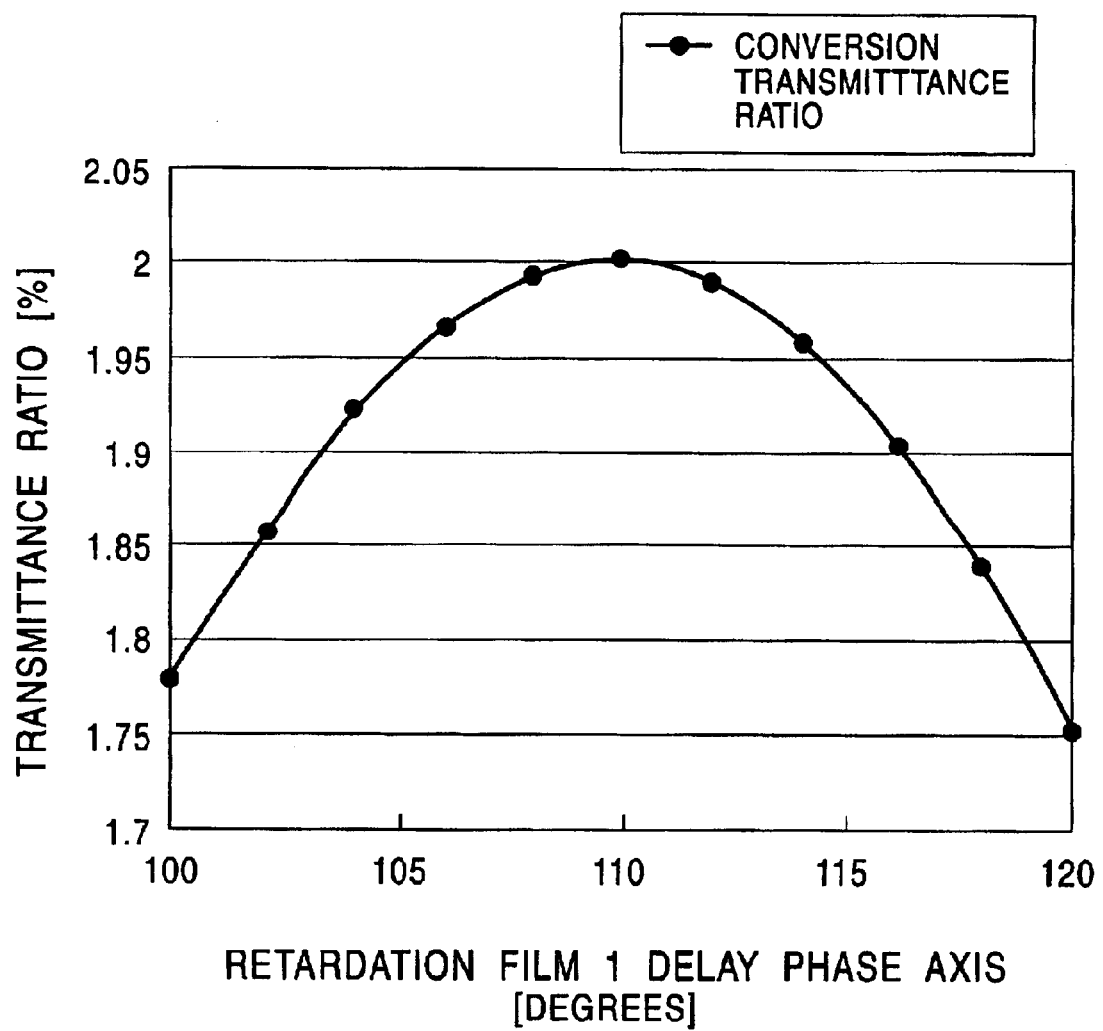
FIG. 9 is a graph showing the results of measurements of optical characteristics of the second example.

FIG. 9 is a graph of the measurement results of the transmittance ratio shown in FIG. 8. The horizontal axis represents the lagging phase axis of the retardation film 1, and the vertical axis represents the transmittance ratio thereof. As is clear from the graph, when the lagging phase axis of the retardation film 1 was set at 110 degrees, which was an ideal angle, the transmittance ratio increased to 2%. From this value, the transmittance ratio decreased.

Figure 10:
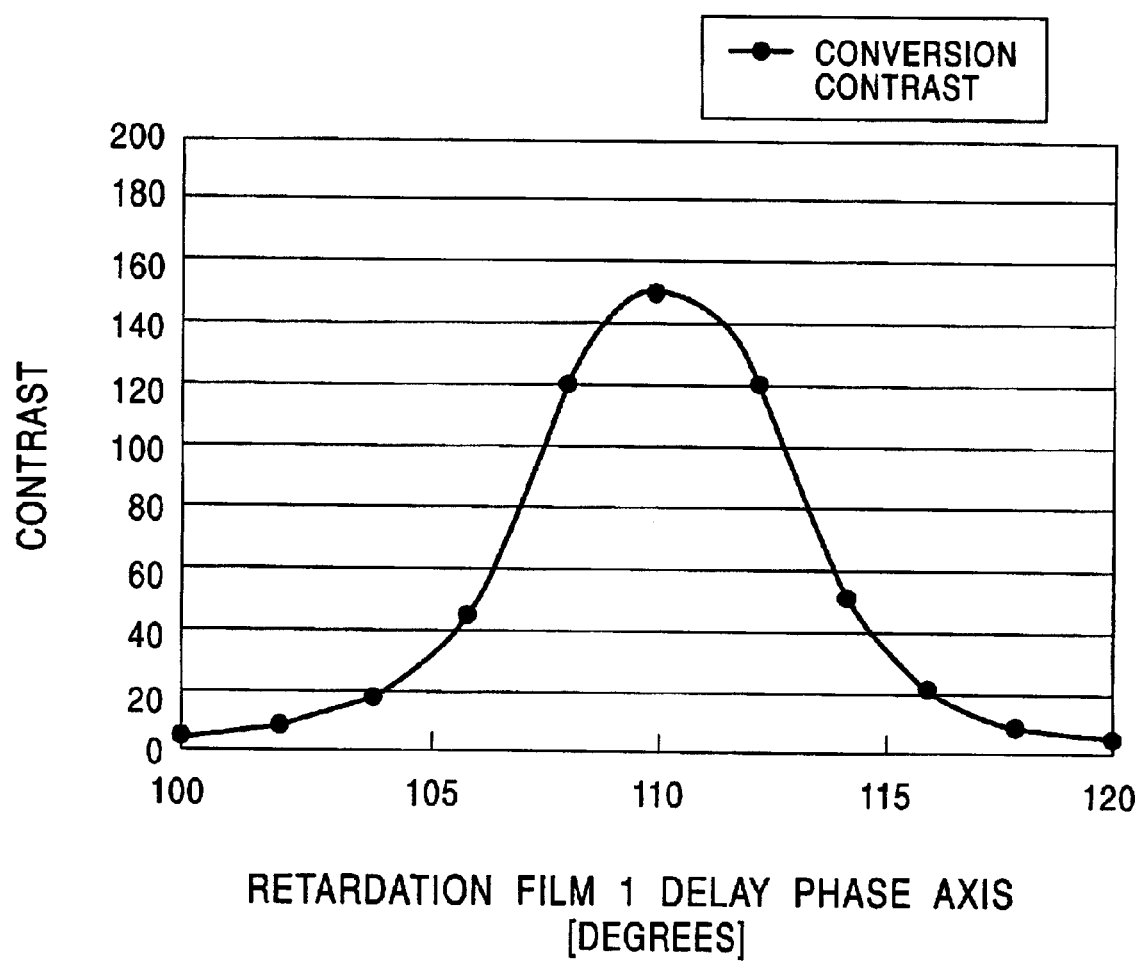
FIG. 10 is a graph showing the results of measurements of optical characteristics of the second example.

FIG. 10 is a graph of the measurement results of the contrast of the second example shown in FIG. 8. The horizontal axis represents the lagging phase axis of the retardation film 1, and the vertical axis represents the contrast. When the lagging phase axis of the retardation film 1 was set at 110 degrees, which was an ideal angle, the contrast was highest at 150. In general, a contrast of at least 10 is required. Therefore, the lagging phase axis of the retardation film 1 was effective within the range of from 100 degrees to 120 degrees. When 110 degrees was used as a reference angle, there were practically no problems when a shift of the lagging phase axis was within a range of ±10 degrees.

FIG. 11 shows the structural features of a panel used in a third example in the form of a table. The third example is basically the same as the first example, except that the phase difference of a retardation film 2 is varied between 110 nm to 170 nm to measure the optical characteristics thereof in the transmission mode.

FIG. 12 shows the measurement results of the optical characteristics of the third example in the transmission mode.

Figure 13:
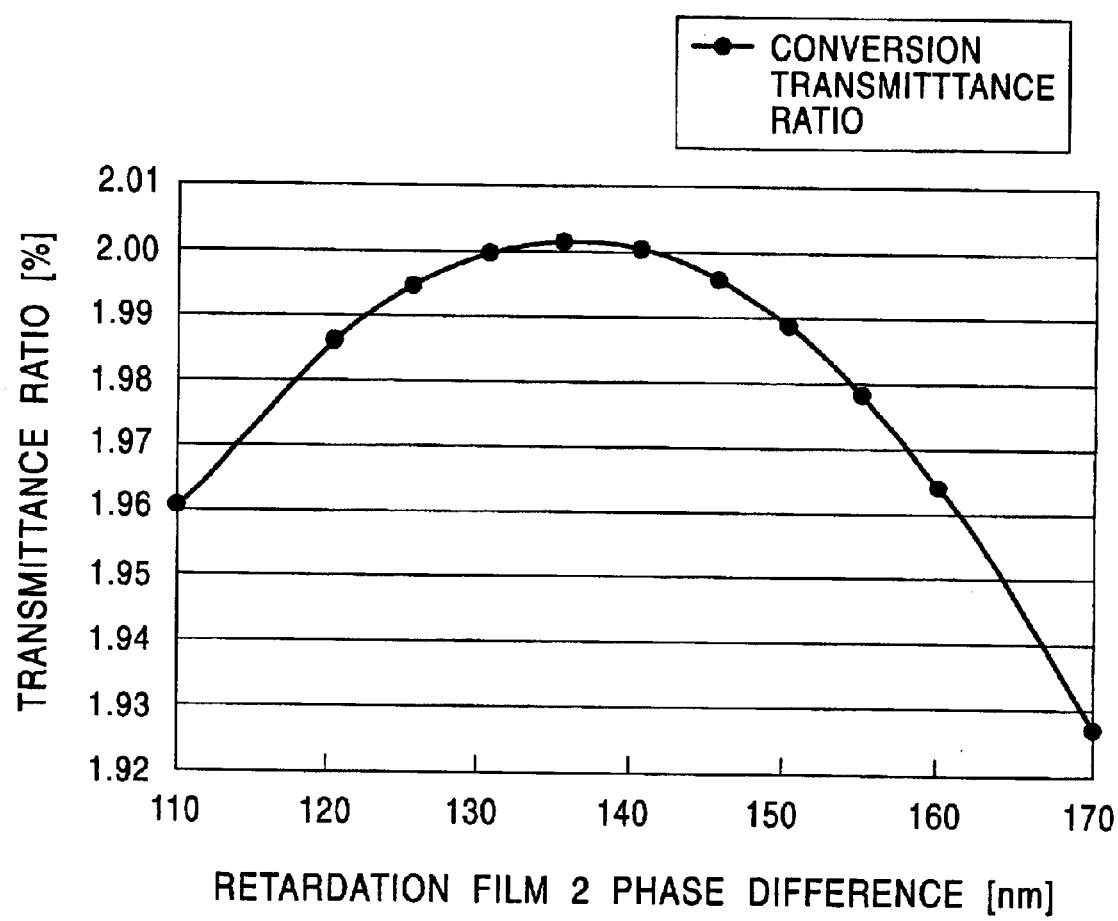
FIG. 13 is a graph showing the results of measurements of the third example.

FIG. 13 is a graph showing changes in the transmittance ratio of the measurement results shown in FIG. 12. The horizontal axis represents the phase difference of a retardation film 2, and the vertical axis represents the transmittance ratio. When the phase difference of the retardation film 2 was 135 nm, the transmittance ratio in the dark display mode was highest, and decreased from this peak value. However, the overall change was within a small range.

Figure 14:
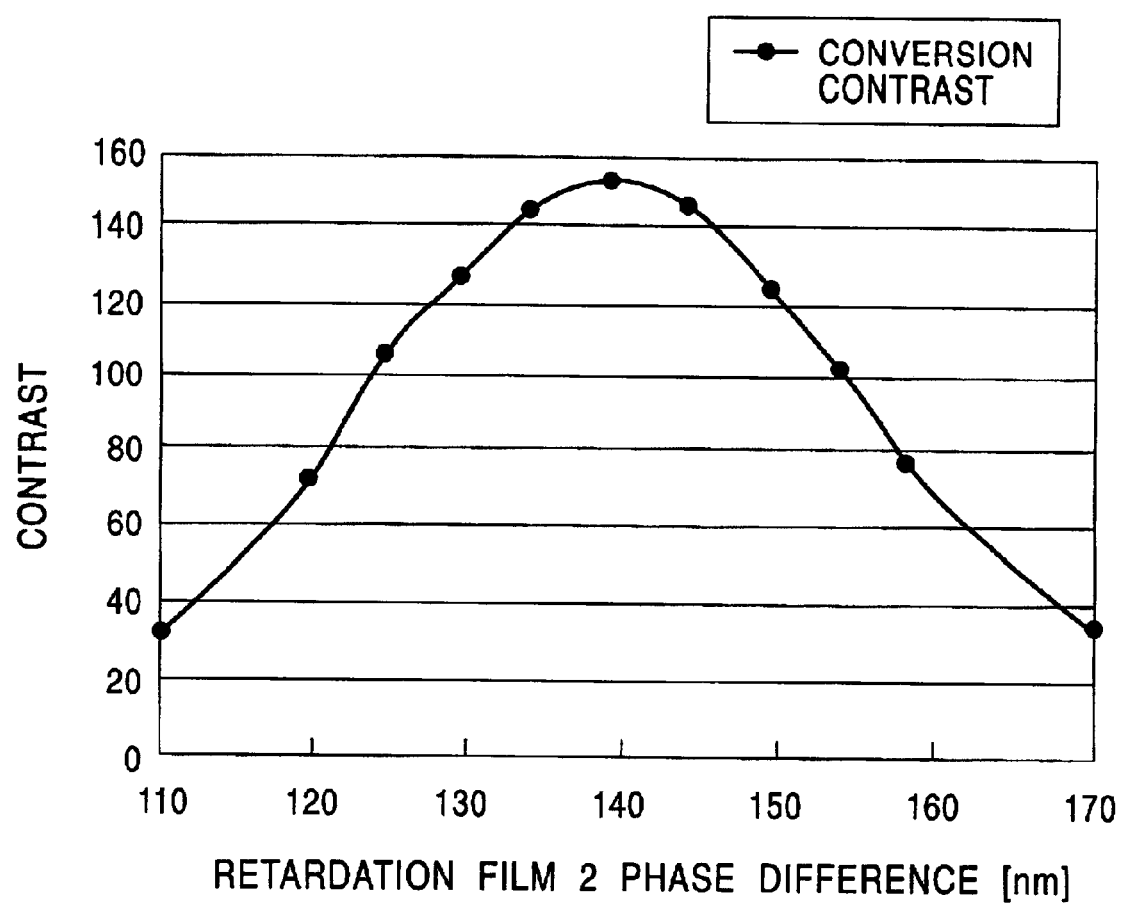
FIG. 14 is a graph showing the results of measurements of the third example.

Of the measurement results of the third example shown in FIG. 12, FIG. 14 shows changes in contrast in the form of a graph. The horizontal axis represents the phase difference of the retardation film 2, and the vertical axis represents the contrast. As is clear from the graph, when the phase difference of the retardation film 2 was exactly at the ideal value of 140 nm, the contrast was highest. Although, as mentioned above, the contrast needs to be at least of the order of 10, it is preferably greater than 20. In this case, when the phase difference of the retardation film 2 was substantially between 110 nm to 170 nm, the contrast was sufficient from the practical viewpoint. When the phase difference of 140 nm at the center of the graph is a reference, it is possible to allow a phase difference shift of ±30 nm.

In order to compare the optical characteristics in the vertical orientation mode and a homogeneous orientation mode in the present invention, a homogeneously oriented reflective-and-transmissive liquid crystal display device was experimentally produced as a reference example. The optical structural features thereof are summarized in the table shown in FIG. 15.

The production process of the reference example is almost the same as that of the first example, so that only the differences will be given. First, the protrusion at the CF substrate side in the first example was not provided in the reference example in the homogeneous orientation mode. Next, instead of the vertical alignment films, a horizontal alignment film was used in the alignment process. More specifically, SE7492 (produced by Nissan Kagaku) was used. The rubbing direction was the same as that in the first example. Liquid crystals having a positive dielectric anisotropy and a refractive index anisotropy ($\Delta n$) of 0.075 were injected. The substrates were superimposed upon each other and assembled using a 2.0 $\mu$m dispersion spacer. The structural features of the retardation films and the polarizing plates are as shown in FIG. 15.

The optical characteristics of the reference example were measured under the same conditions as those of the first example. In the transmission mode, the transmittance ratio was 2.0 and the contrast was 80. As is clear from the results, it was confirmed that, compared to the contrast of the reference example in the homogeneous orientation mode, the contrast of the first example in the vertical orientation mode was better.

Figure 16:
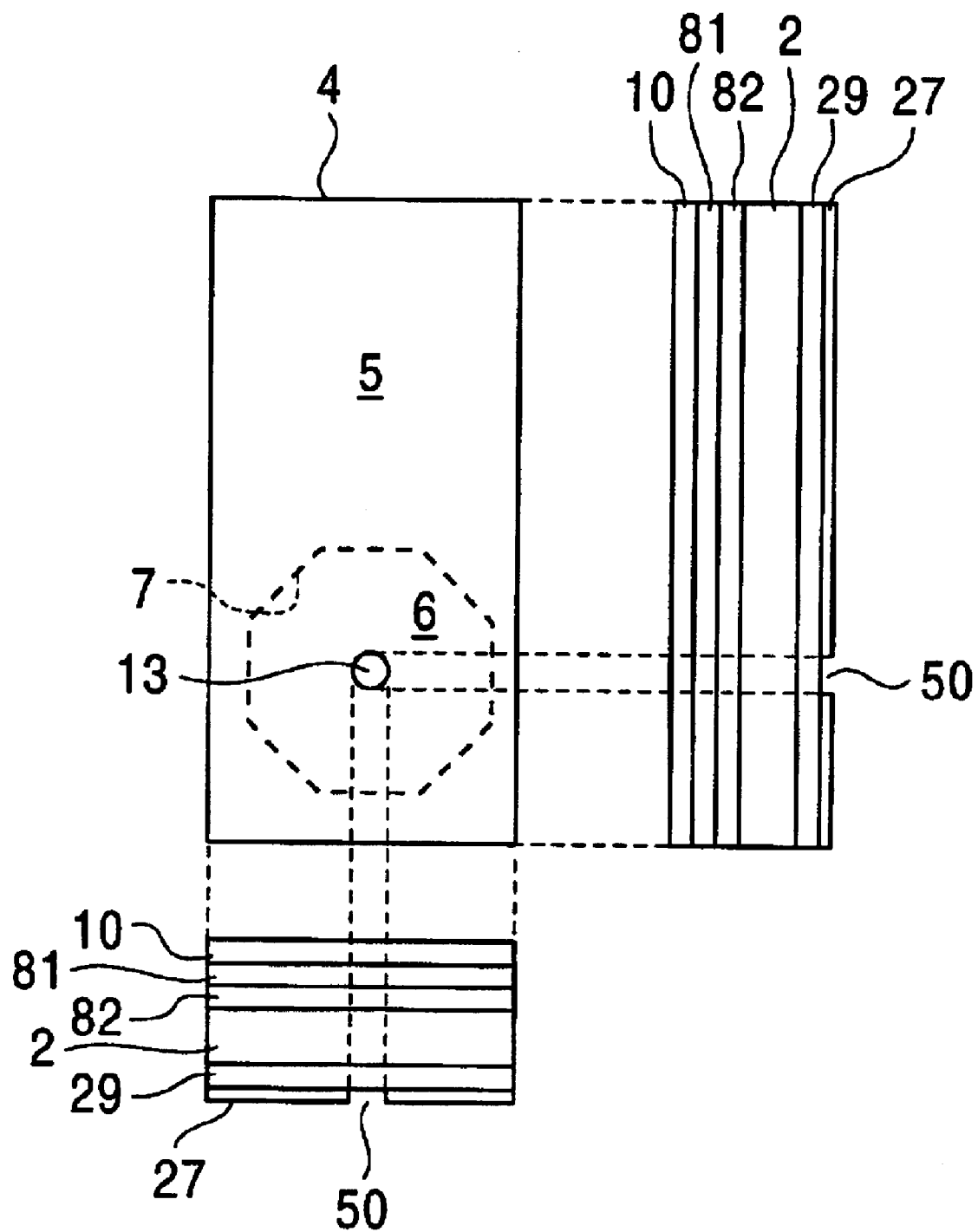
FIG. 16 is a schematic view of another example.

Next, a fourth example is shown in FIG. 16. For the sake of easy understanding, corresponding parts to those of the first example are given the same reference numerals. Instead of the structure of the first example providing a protrusion at the CF-side substrate, a structure where a circular portion of a transparent electrode 27 was removed by etching was used. An ITO slit 50 formed by the etching produced the same effect as the protrusion used in the first example. When the liquid crystal orientation state at a transmission region 6 when an electrical field was applied thereto was confirmed, it was confirmed that the liquid crystals were radially oriented with the ITO slit as a center. The optical characteristics of the liquid crystal display device produced in this way was evaluated using the same method as that used for the first example. In the transmission mode, the transmittance ratio was 2.0, and the contrast was 150. It was confirmed that the same results as those of the first example were obtained.

Figure 17:
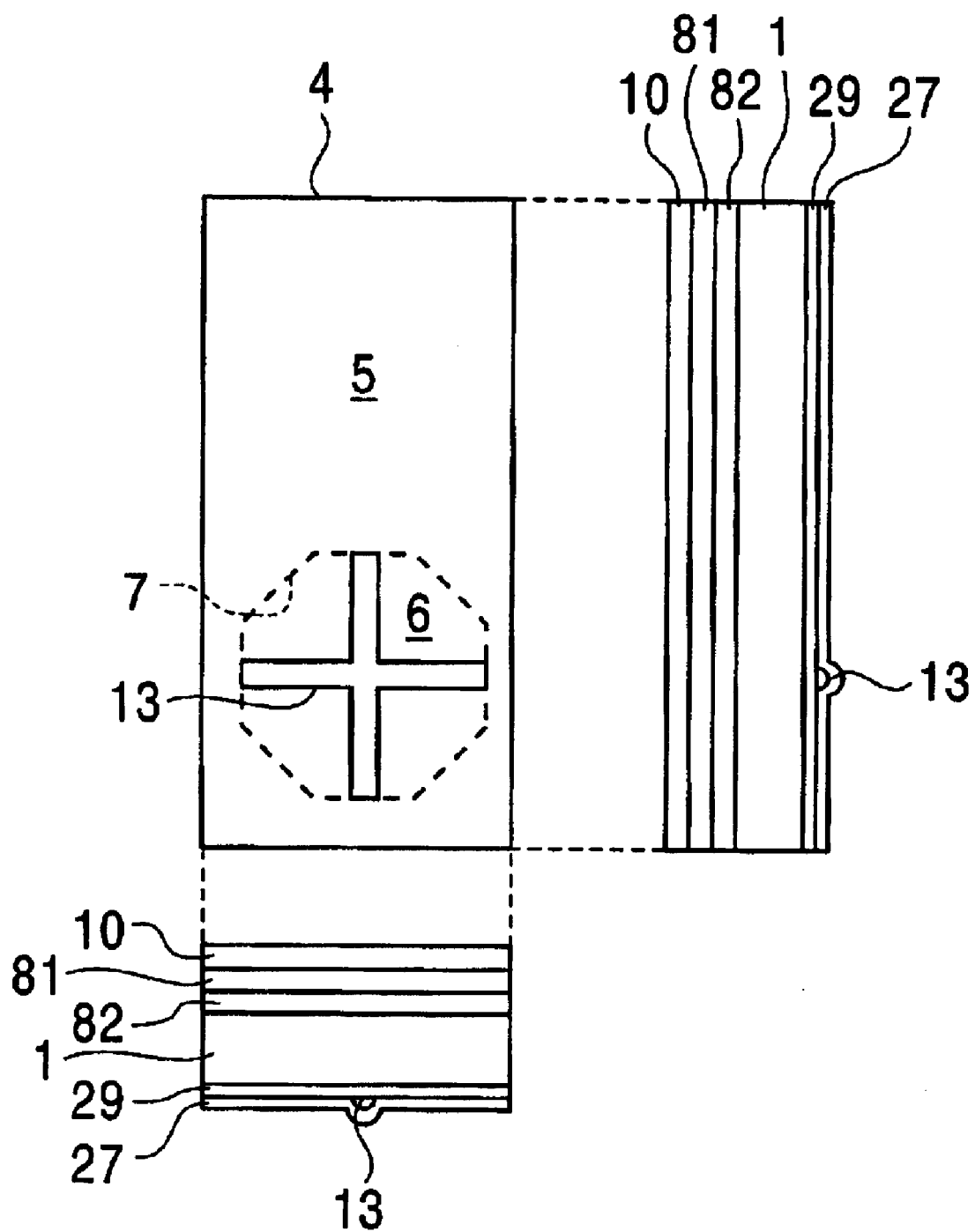
FIG. 17 is a schematic view of still another example.

Next, a fifth example is shown in FIG. 17. For the sake of easy understanding, corresponding parts to those of the first example are given the same reference numerals. Instead of the protrusion in the first example, a cross-shaped rib structure 13 was provided on ITO. When the liquid crystal orientation state at a transmission region 6 when an electrical field was applied was confirmed, it was confirmed that the liquid crystals were radially oriented with the cross-shaped rib structure 13 as a center. The optical characteristics of the liquid crystal display device produced in this way were evaluated using the same method as that used for the first example. In the transmission mode, the transmittance ratio was 2.0, and the contrast was 150. It was confirmed that same results as those of the first example were obtained.

In a sixth example, liquid crystal display devices were produced by the alignment process carried out in the first example for the case where only a TFT substrate was rubbed, where only a CF-side substrate was rubbed, and where neither of them were rubbed. When only one of the substrates was rubbed, the state of orientation of the liquid crystals was substantially the same as that of the first example. When neither of the substrates were rubbed, it was confirmed that, compared to the state of orientation of the transmission region of the first example, the state of orientation was such that the transmission region was radially oriented with greater symmetry. The orientation of the reflection region was such that the bumpy portion of a scattering plate was effective in randomly orienting the liquid crystals, so that the viewing angle in the reflection mode was wide. In spite of the random orientation, there was little reduction in the reflection ratio. This is because the present invention has the effect of allowing the liquid crystal display device to function even in the reflection mode. The optical characteristics of each of the liquid crystal display devices produced in this way were evaluated using the same method as that used for the first example. In the transmission mode, the transmittance ratio was 2.0, and the contrast was 150. It was confirmed that the same results as those of the first example were obtained.

Figure 18:
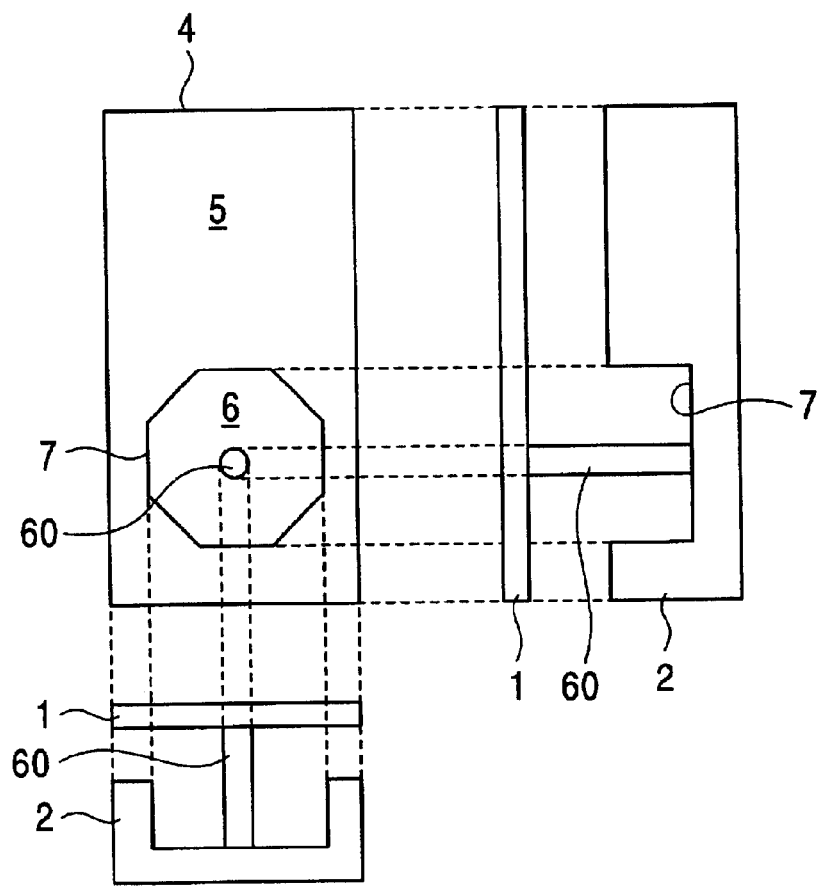
FIG. 18 is a schematic view of still another example.

A seventh example is shown in FIG. 18. For the sake of easy understanding, corresponding parts to those of the first example are given the same reference numerals. Instead of the protrusion on the CF substrate used in the first example, a spacer column 60 with a height of approximately 4.0 $\mu$m was formed. A transmission region 6 had a regular octagonal shape in cross section, with a diagonal line being 8 $\mu$m. A CF substrate 1 and a TFT substrate 2 were bonded together without a spacer dispersion process. It was found out that, as a result, the cell thickness was, as in the case where the dispersion spacer was used, such that the transmission section 6 was approximately 4.0 $\mu$m thick, and a reflection section 5 was approximately 2.0 $\mu$m thick. At the same time, when the state of orientation of the liquid crystals at the transmission region 6 when an electrical field was applied was observed, it was confirmed that the orientation of the liquid crystals was controlled so that they were oriented radially with the spacer column 60 as a center. In other words, it was confirmed that, in the seventh example, the spacer column 60 functioned as a spacer maintaining a gap between the TFT substrate 2 and the CF substrate 1, and, at the same time, as a core for radially orienting the transmission region 6. The optical characteristics of the liquid crystal display device produced in this way were evaluated using the same method as that used for the first example. In the transmission mode, the transmittance ratio was 1.85, and the contrast was 150. It was confirmed that the same results as those of the first example were obtained. Since the spacer column 60 did not contribute to the transmittance ratio, the transmittance ratio when a voltage was turned on was slightly reduced, but the other parameters were as good as those of the first example.

Figure 19:
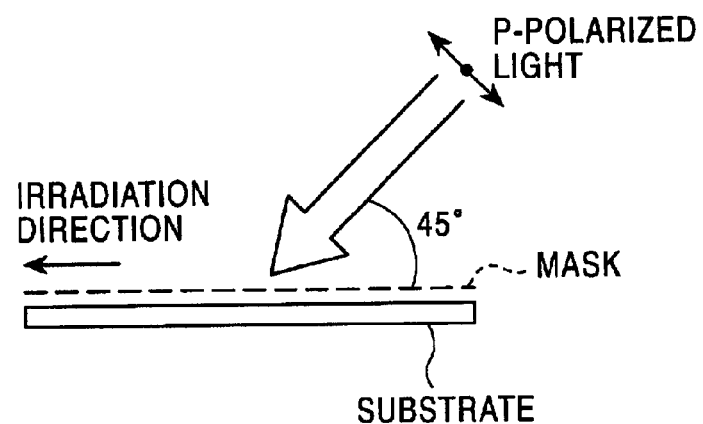
FIG. 19 is a schematic view of still another example.

An eighth example is shown in FIG. 19. The orientation process of the first example was changed in order to control the orientation of the liquid crystals by the following method. JALS2021 (JSR), used as a vertical alignment film, was printed onto both a TFT substrate and a CF substrate in order to bake the resulting structure for one hour at an angle of 180 degrees. Then, the alignment film was selectively irradiated with polarized ultraviolet light. A mercury lamp was used as an ultraviolet lamp. Polarized ultraviolet light was realized by passing ultraviolet light through a layered structure of dielectric multilayer films. The alignment film was irradiated with the polarized ultraviolet light at an angle of 45 degrees from a normal line of the substrates. The irradiation direction defined in FIG. 19 was made the same as the rubbing direction in the first example. The polarized ultraviolet light was used to selectively irradiate only the reflection region using a mask. The ultraviolet energy of the ultraviolet light used for the irradiation was approximately 1 J/cm$^2$ at 365 nm. By carrying out the above-described alignment process, it was possible to subject only the reflection section to the alignment process. By producing a liquid crystal device by bonding together both substrates subjected to the alignment process, the same evaluations as those of the first example were carried out. In the transmission mode, the transmittance ratio was 2.0, and the contrast was 150. Although the optical characteristics were almost the same as those of the first example, it was confirmed that the orientations of the transmission region were more uniformly divided than in the first example.

In a ninth example, liquid crystals mixed with a chiral material were used. A panel was experimentally produced by only changing the liquid crystals to be injected of the first example. Although the same liquid crystal material was used, a chiral agent was mixed in the liquid crystals to adjust the chiral pitch to 50 $\mu$m. The liquid crystals were injected by the same process as that of the first example, and the same mounting operation as that in the first example was carried out in order to evaluate the optical characteristics. In the transmission mode, the transmittance ratio was 2.0, and the contrast was 150. Although the optical characteristics were not inferior to those of the first example, it was confirmed that, as a result of viewing the liquid crystal display device with the human eye, the viewing angle characteristics were better than those of the first example.

By using the present invention, the reflective-and-transmissive liquid crystal display device can be expected to provide the following advantages.

1. The reflection display region can provide both high contrast and high reflection ratio.
2. The transmission display region can provide high contrast, high transmittance ratio, and a wide viewing angle.
3. The design of the retardation films can be simplified, the number of retardation films can be reduced to a minimum of two retardation films, and the panel can be produced at a low cost. The number of retardation films is not limited to a pair thereof, so that two or more pairs thereof may be used.

4. Since the mode is a vertical orientation normally black mode, it is not necessary to carry out a light-shielding operation to provide good contrast. Since it is not necessary to carry out a light-shielding operation, the opening ratio becomes large, thereby making it possible to realize a high reflection ratio and a high transmittance ratio.

5. In the vertical orientation mode, the threshold value of the voltage-versus-transmittance-ratio curve is large. Therefore, this mode provides the advantage that it is difficult to recognize cross-talk.

6. The rubbing operation can be omitted, so that the rubbing cleaning operation can be omitted. These two processes are omitted, and the tact time is reduced. At the same time, a reduction in yield due to rubbing is prevented, and dust produced by rubbing is prevented from being produced.

What is claimed is:

1. A liquid crystal display device comprising:

a first substrate capable of transmitting light therethrough;

a second substrate at which a pixel including a reflection region and a transmission region is formed; and a liquid crystal section held by the first substrate and the second substrate that are bonded together through a gap;

wherein the liquid crystal section is oriented vertically with respect to the substrates when no voltage is applied thereto;

wherein a pair of retardation films are disposed on both sides of the vertically oriented liquid crystal section, and have symmetrical viewing angle characteristics in the horizontal direction; and wherein relative shifts in phase differences of the pair of retardation films are controlled within a range of ±30 nm.

2. A liquid crystal display device comprising:

a first substrate capable of transmitting light therethrough;

a second substrate at which a pixel including a reflection region and a transmission region is formed; and a liquid crystal section held by the first substrate and the second substrate that are bonded together through a gap;

wherein the liquid crystal section is oriented vertically with respect to the substrates when no voltage is applied thereto;

wherein a pair of retardation films are disposed on both sides of the vertically oriented liquid crystal section, and have symmetrical viewing angle characteristics in the horizontal direction;

wherein at least one of the first and second substrates includes a step for changing the thickness of the liquid crystal section by the transmission region and the reflection region;

wherein the step is a recess formed by selectively removing an insulating film formed at at least one of the first and second substrates from the transmission region; and wherein the orientation of the liquid crystal section is controlled using the recess, and wherein the vertical orientation thereof switches to a multiaxial orientation thereof by application of a voltage.

3. A liquid crystal display device according to claim 2, wherein the recess is symmetrical about a geometrical center point thereof.

4. A liquid crystal display device according to claim 2, wherein the liquid crystal section has a chiral agent added thereto, and wherein the vertical orientation thereof changes to a twist orientation thereof by application of a voltage.

5. A liquid crystal display device comprising:

a first substrate capable of transmitting light therethrough;

a second substrate at which a pixel including a reflection region and a transmission region is formed; and a liquid crystal section held by the first substrate and the second substrate that are bonded together through a gap;

wherein the liquid crystal section is oriented vertically with respect to the substrates when no voltage is applied thereto;

wherein a pair of retardation films are disposed on both sides of the vertically oriented liquid crystal section, and have symmetrical viewing angle characteristics in the horizontal direction;

wherein a portion of the liquid crystal section at the transmission region is oriented multiaxially by application of a voltage; and wherein a portion of the liquid crystal section at the reflection region is oriented uniaxially by application of a voltage.

6. A liquid crystal display device according to claim 5, wherein the liquid crystal section is controlled so as to be oriented multiaxially using an electrode slit or a columnar member formed at the transmission region.

7. A liquid crystal display device according to claim 6, wherein the columnar member also serves as a spacer for restricting the gap between the first and second substrates at a constant size.

8. A liquid crystal display device comprising:

a first substrate capable of transmitting light therethrough;

a second substrate at which a pixel including a reflection region and a transmission region is formed; and a liquid crystal section held by the first substrate and the second substrate that are bonded together through a gap;

wherein the liquid crystal section is oriented vertically with respect to the substrates when no voltage is applied thereto;

wherein a pair of retardation films are disposed on both sides of the vertically oriented liquid crystal section, and have symmetrical viewing angle characteristics in the horizontal direction; and wherein the reflection region is subjected to rubbing for uniaxially orienting the liquid crystal section, and wherein the transmission region is not subjected to rubbing.

9. A liquid crystal display device comprising:

a first substrate capable of transmitting light therethrough;

a second substrate at which a pixel including a reflection region and a transmission region is formed; and a liquid crystal section held by the first substrate and the second substrate that are bonded together through a gap;

wherein the liquid crystal section is oriented vertically with respect to the substrates when no voltage is applied thereto;

wherein a pair of retardation films are disposed on both sides of the vertically oriented liquid crystal section, and have symmetrical viewing angle characteristics in the horizontal direction; and wherein, by selective irradiation using ultraviolet light, a difference is produced between a surface state of the transmission region and a surface state of the reflection region in order to cause the state of orientation of the liquid crystal section to differ by the transmission region and the reflection region.

* * * * *

UNITED STATES PATENT AND TRADEMARK OFFICE
CERTIFICATE OF CORRECTION

PATENT NO. : 6,753,939 B2 Page 1 of 1
DATED : June 22, 2004
INVENTOR(S) : Makoto, Jisaki and Hidemasa, Yamaguchi It is certified that error appears in the above-identified patent and that said Letters Patent is hereby corrected as shown below:

<u>Title page,</u>
Item [75], Inventors, please delete "Yoshitoshi Kida."

Signed and Sealed this

Fourteenth Day of December, 2004

JON W. DUDAS
*Director of the United States Patent and Trademark Office*